United States Patent [19]
Scott

[11] Patent Number: 4,691,458
[45] Date of Patent: Sep. 8, 1987

[54] TAGS

[75] Inventor: Michael J. Scott, Fielding, New Zealand

[73] Assignee: Allflex International Limited, Palmerston North, New Zealand

[21] Appl. No.: 657,075

[22] Filed: Oct. 2, 1984

[30] Foreign Application Priority Data

Oct. 3, 1983 [NZ] New Zealand .................. 205842

[51] Int. Cl.⁴ .............................................. C09F 3/00
[52] U.S. Cl. .................... 40/300; 40/21 C; 40/304
[58] Field of Search ............... 40/20, 22, 21 C, 301, 40/300, 304

[56] References Cited

U.S. PATENT DOCUMENTS

| | | | |
|---|---|---|---|
| 3,184,874 | 5/1965 | Schofield | 40/301 |
| 3,260,007 | 7/1966 | Hayes | 40/301 |
| 3,958,353 | 5/1976 | Hayes | 40/301 |
| 4,060,921 | 12/1977 | Robinson | 40/301 |
| 4,102,073 | 7/1978 | Hayes | 40/301 |

*Primary Examiner*—Gene Mancene
*Assistant Examiner*—Wenceslao J. Contreras
*Attorney, Agent, or Firm*—Blakely, Sokoloff, Taylor & Zafman

[57] ABSTRACT

A tag for attachment to the ear of an animal, said tag comprising in combination a male component having a headed stem and a female component having a base portion 11 with an upper surface and a lower surface, a panel 10 projecting upwardly from the upper surface. An opening 12 is formed in the base portion 11 and the headed portion of the stem of the male component is able to pass through the opening 12 to effect coupling of the male and female components. The lower surface of the base 11 includes an engagement surface 16 which in use of the tag engages with the upper outer surface of an animal's ear. The engagement surface 16 has a profile which relative to the panel is transverse to the plane of the panel and follows the contour of the upper outer surface of the animal's ear to which the tag is to be applied to resist swivelling movement of the tag about the axis of coupling between the male and female components.

6 Claims, 5 Drawing Figures

TAGS

This invention relates to a tag which is particularly suitable for attachment to the ear of an animal for use as, for example, means of identification.

In our U.S. Patent Specification No. 4060922 there is disclosed a tag, primarily used for animal identification purposes, which incorporates in its construction a panel on which indicia can be positioned, the panel being so orientated that when the tag is placed in an animal's ear the panel projects upwardly from the top of the ear. As a result of the upstanding nature of the panel the identification indicia is readily visible to an observer. It is preferred that the panel remain in a forward facing disposition relative to the ear and accordingly the tag of our aforesaid patent specification is, in its preferred form, of a one piece construction with a narrow flap which curves around the thick leading top part of the ear. This flap not only forms part of the means which holds the flexible indicia panel in an upright position but also ensures that the indicia panel remains forward facing relative to the ear.

With any animal ear tag it is important that the tag remains firmly in place in the ear as the loss of a tag results in loss of the means of identifying the animal. Accordingly it is preferred that the tag not be liable to snagging on fences, branches, brush, etc. as such snagging often leads to the tag being pulled from the ear. Consequently it is desirable that the tag be made of a resilient material so that it will be flexible such that if the tag is snagged it can bend and twist away from the snagging obstacle.

Whilst the tag of our aforesaid patent specification is fully flexible in construction there is a possibility that the tag can be snagged by an obstacle such as for example a thin branch, fence wire or the like becoming located behind the portions forming the aforesaid flap which curves over the front of the ear. This is especially so when the tag has been incorrectly applied such that the flap does not snuggly fit over the front of the ear.

To overcome this problem it has been suggested to provide a conventional two piece tag, of for example, the construction disclosed in our United States Patent Specification No. 3731414, but with the panel of the female component formed to extend in a plane at right angles to that in which the panel would normally extend. The tag would thus be of the type of construction shown in New Zealand Patent Specification No. 177302. Such a tag is applied by passing the headed stem of the male component up through the top of the ear of the animal and into the opening in the female component so that the panel will be positioned to extend vertically upward from the ear. The tag is, however, not fixed in any particular orientation and thus will usually tend to swivel away from its desired forward facing position.

The present invention has as its object a means of overcoming this problem in that there is provided a tag for attachment to the ear of an animal, said tag comprising:

a male component having a headed stem;
   a female component having a base portion with an upper surface and a lower surface;
   a panel projecting upwardly from said upper surface;
   an opening in said base portion through which the headed portion of the stem of the male component can pass to effect coupling of the male and female components;
   said lower surface including an engagement surface which use of the tag engages with the upper outer surface of an animal's ear, said engagement surface having a profile which, relative to the panel, is transverse to the plane of the panel and follows the contour of the upper outer surface of the animal's ear to which the tag is to be applied to resist swivelling movement of the tag about the axis of coupling between the two components.

In more fully describing the invention reference will be made to the accompanying drawings in which.

The tag is formed of two components, one being a male component the other being a female component. The male component 6 consists of a base 7, which can for example be of circular shape, from which projects a headed stem 8. The male component can be of one piece construction formed from a rigid or semi-rigid material, however, it is preferred that it be of the construction disclosed in our United States Patent Specification No. 3731414. As an alternative arrangement the headed stem can be formed as part of the component having the panel which is to project upwardly from the ear and in such a case the female component would be preferably of a circular shape having an opening therein with preferably a boss surrounding the opening. For the purposes of describing the preferred form of the invention, however, the present disclosure will refer to the female component being the component having the panel on which indicia can be positioned.

Figure 1:
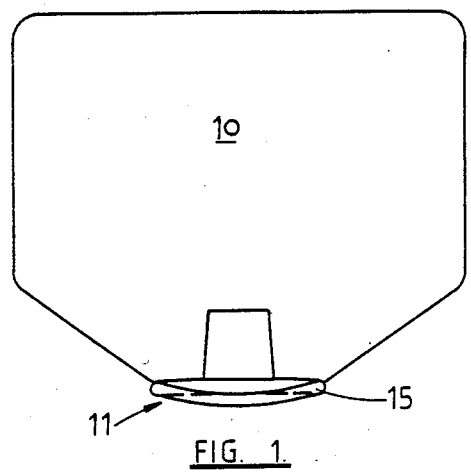
FIG. 1 is an elevational view of one form of the female component of the tag.

Referring now more particularly to the drawings, in FIG. 1 there is shown the female component of a two piece tag, this component being preferably constructed in one piece and preferably constructed from a resilient material such as polyurethane. The component includes a panel 10 on which identification indicia can be marked.

The panel 10 extends upwardly from a base 11. An opening 12 is provided in the base portion 11 and preferably has a belled or a divergent mouth portion 13 which serves to provide a leading end for the head of the male component during coupling. Opening 12 is of a diameter which is less than the greatest diameter of the headed portion of the male component.

In the preferred form the head of the male component locates within an enclosed cavity 14 in the base portion 11 so that when the tag parts are coupled the head is fully enclosed within the cavity. This, however, is only a preferred embodiment and head could either locate within a partially enclosed cavity or merely be situated between spaced apart legs which join the panel 10 to the base 11.

Figure 3:
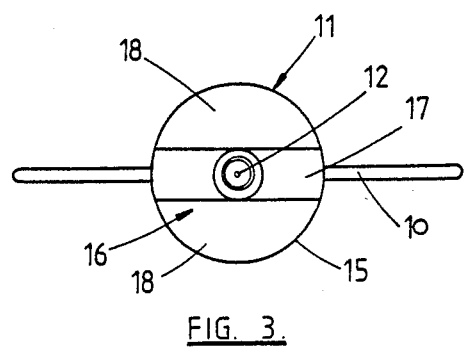
FIG. 3 is an underside plan view.
Figure 4:
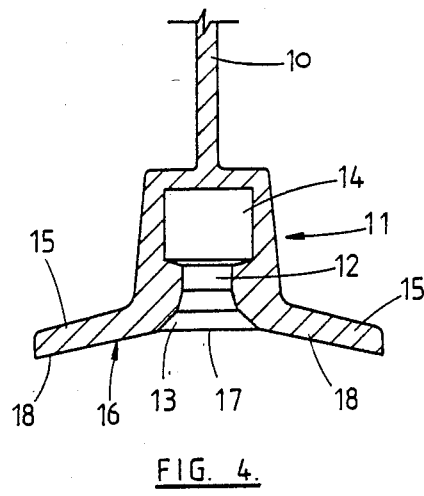
FIG. 4 is a cross-sectional view in enlarged scale of the bottom portion of the component as viewed in FIG. 2.
Figure 2:
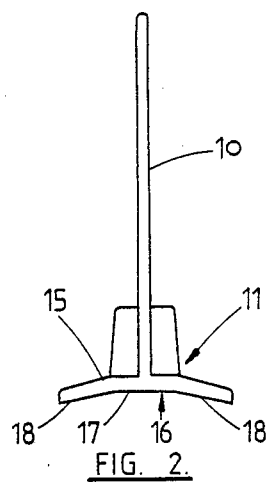
FIG. 2 is a side elevational view of the component shown in FIG. 1.
Figure 5:
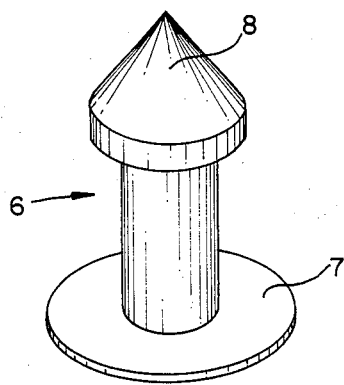
FIG. 5 is a perspective view of the male component.

Base 11 has an ear engaging flange 15 which in its preferred form when viewed in plan (as shown in FIG. 3) is circular. The underside of flange 15 provides an ear engaging surface 16 which is profiled to fit and substantially conform with the contours of the part of the ear to which the tag is normally applied, i.e. the upper top surface of the animal's ear. Ear engaging surface 16 can be of a concave shape of a curved configuration or alternatively can be of the shape shown in the drawings wherein there is a substantially flat elongate surface portion 17 flanked either side by downwardly and outwardly inclined flat surface portions 18.

The tag is applied to an animal's ear by forcing the headed stem 8 of the male component up from the inside of the ear through the top portion of the ear. This is preferably carried out by the use of a pliers type applicator, said applicator holding in position above the male component the female component as illustrated in the drawings. The headed stem, when it is passed through opening 12 and into cavity 14, couples the two components together and ensures that the ear engaging surface 16 of the female component fits on the upper top portion of the ear. The shaped ear engaging surface 16 ensures that the flange 15 sits snuggly in substantial conformity with the contour of the ear such that the panel 10 is forwardly facing relative to the ear. This close conformity of the flange 15 with the contour of the ear provides a means which removes the tendency for the tag to twist about the axis of coupling.

I claim:

1. A tag for attachment to the ear of an animal, said tag comprising:
   a female component having a base portion with an upper surface and lower surface;
   a panel projecting upwardly from said upper surface;
   an opening in said base portion;
   said lower surface including an engagement surface which in use of the tag engages with the upper outer surface of an animal's ear, said engagement surface having a curved profile which, relative to the plane of the panel and follows the contour of the upper outer surface of the animal's ear to which the tag is to be applied to resist swivelling movement of the tag about the axis of coupling of said female component.

2. A tag for attachment to the ear of an animal, said tag comprising:
   a female component having a base portion with an upper surface and a lower surface;
   a panel projecting upwardly from said upper surface;
   an opening in said base portion; said base portion including an enclosed cavity into which said opening opens, said lower surface including an engagement surface which in use of the tag engages with the upper outer surface of an animal's ear, said engagement surface having a profile which, relative to the panel, is transverse to the plane of the panel and follows the contour of the upper outer surface of the animal's ear to which the tag is to be applied to resist swivelling movement of the tag about the axis of coupling of said female component.

3. A tag for attachment to the ear of an animal, said tag comprising:
   a female component having a base portion with a panel projecting therefrom;
   an opening in said base portion;
   an enclosed cavity within said base and into which said opening opens;
   an ear engagement surface on said base portion, said ear engagement surface comprising:
      an elongate first surface portion located transverse to the plane in which said panel lies. and second surface portions which project from each long side of the first portion to incline downwardly relative to said panel.

4. The tag according to claim 3 wherein said first and second surface portions are substantially flat.

5. The tag according to claim 3 wherein the female component is formed from a resilient plastics material.

6. The tag according to claim 3 wherein the base portion is of substantially circular shape when viewed from above.

* * * * *